United States Patent [19]

Taoda et al.

[11] Patent Number: 5,562,820

[45] Date of Patent: Oct. 8, 1996

[54] PROCESS FOR PURIFYING WATER

[75] Inventors: Hiroshi Taoda, Nagoya; Eiji Watanabe, Ama-gun; Tatsuro Horiuchi; Shigekazu Kato, both of Nagoya; Seiichiro Omori, Konan; Hiroaki Yokoi, Ichinomiya, all of Japan

[73] Assignees: Agency of Industrial Science and Technology, Tokyo; Kato Manufacturing Corporation Limited, Komaki; Aiwa Corporation Limited, Iwakura, all of Japan

[21] Appl. No.: 487,643

[22] Filed: Jun. 7, 1995

Related U.S. Application Data

[62] Division of Ser. No. 145,181, Nov. 3, 1993, Pat. No. 5,449,467.

[30] Foreign Application Priority Data

Nov. 20, 1992 [JP] Japan .................................. 4-335083

[51] Int. Cl.$^6$ .................... B01J 19/00; C02F 1/32
[52] U.S. Cl. ................ 210/94; 210/205; 210/251; 422/186.3; 422/241
[58] Field of Search .................... 210/762, 763, 210/94, 205–209, 251; 422/186.3, 211, 222, 232, 240, 241

[56] References Cited

U.S. PATENT DOCUMENTS

| | | | |
|---|---|---|---|
| 3,926,702 | 12/1975 | Oki et al. | 422/241 |
| 4,161,510 | 7/1979 | Edridge | 422/240 |
| 4,604,215 | 8/1986 | McCorquodale | 210/762 |
| 4,751,005 | 6/1988 | Mitsui et al. | 210/762 |
| 4,892,712 | 1/1990 | Robertson et al. | 422/186.3 |
| 5,275,741 | 1/1994 | Miano et al. | 210/763 |
| 5,302,356 | 4/1994 | Shadman et al. | 210/763 |
| 5,358,645 | 10/1994 | Hong et al. | 210/762 |

*Primary Examiner*—Thomas G. Wyse
*Attorney, Agent, or Firm*—Oblon, Spivak, McClelland, Maier, & Neustadt, P.C.

[57] ABSTRACT

The present invention aims at providing an economical process for purifying water which can produce clean water by treating polluted water, which contains agricultural chemicals, organic solvents (particularly, halocarbon) and surface active agents (particularly, those with side chains) which are hard to treat according to a conventional activated sludge process, under moderate conditions readily and promptly, and also, which process is characterized by adding titanium oxide and iron salt into water to be treated, and irradiating light thereupon.

10 Claims, No Drawings

5,562,820

PROCESS FOR PURIFYING WATER

This is a Division of application Ser. No. 08/145,181 filed on Nov. 3, 1993, now U.S. Pat. No. 5,449,467.

BACKGROUND OF THE INVENTION

1. Field of the Invention

The present invention relates to a process for purifying water including service water and waste water.

Though water is indispensable for maintaining human life together with air, earth and the sun, recently, pollution of valuable water, which includes water pollution due to daily waste water and industrial waste water and the pollution of the sea due to tanker accidents, has been spreading on the earthwide scale to become a worldwide problem. In our country blessed with rich water resources, (1) pollution of underground water and sources of water supply caused by organic solvents used in industries of high technology and laundries, (2) eutrophication of lakes and rivers and pollution of sources of water supply caused by daily waste water due to synthetic detergents (surface active agents), and (3) water pollution caused by the outflow of agricultural chemicals used at golf courses, have extended over a wide range, and become a serious problem.

Besides, since a vast amount of chlorine and disinfectants are used in the treatment of service water in comparison with former times because of the pollution of sources of water, they may remain in service water, and form organochlorine compounds by reacting with organic materials in original water, and further, algae, planktons and mold occur according to the eutrophication of lakes, and therefore, city water tastes bad and pollution of it is becoming a serious problem.

2. Description of the Prior Art

As the conventional treatment of waste water, can be mentioned an activated sludge process, and this process, however, has defects that its reaction conditions about a temperature, pH, a gas atmosphere and toxicity are strict since it employs microorganisms, namely, living things, and that it can neither readily decompose nor remove the above-mentioned agricultural chemicals, organic solvents (particularly, halocarbon) and surface active agents (particularly, those with side chains) and has no effect on them.

As methods of treating such organic substances as to be hard to decompose biologically, can be mentioned activated carbon adsorption, chemical oxidation, reverse osmosis and incinerating treatment, and either of which has some problems in effects and economical points.

Typical oxidizers to be used in chemical oxidation are chlorine and ozone. Chlorine, however, has problems in respect of oxidizing power, reaction properties with an ammonium ion and residual chlorine due to excess injection, and besides, it forms trihalomethane and organochlorine compounds having carcinogenicity by reacting with organic substances contained in water to be treated. On the other hand, ozone has a defect that both the expenses of equipment and the cost of operation are very high (e.g., Takane Kitao, Ryosuke Yahashi, "Water Purification and Liquid Wastes Treatment", Vol. 8, No. 8, 35 (1976)). And further, incinerating treatment is impracticable in case of dilute solutions.

A Fenton reagent discovered by H. J. H. Fenton in 1890's is known to have a strong oxidizing power, in which ferrous salt is added into hydrogen peroxide water (H J H Fenton, "J Chem Soc." Vol 65, 899 (1894)). Hydrogen peroxide has large advantages that its price per unit of effective oxygen amount is fairly lower than that of ozone, and that it does not need expensive equipment, and hence, generally, studies upon the Fenton treatment, that is water treatment by means of a Fenton reagent, have been performed.

However, this method has defects that it is needed to use hydrogen peroxide solution having carcinogenicity, and that its reaction progresses at a slow rate, and further that it requires high acid conditions that the pH of water to be treated should be 2 to 4.

SUMMARY OF THE INVENTION

An object of the present invention is to provide an economical process for purifying water under moderate conditions readily and promptly to produce clean water, which process is applicable to treatment of polluted water containing agricultural chemicals, organic solvents (particularly, halocarbon) and surface active agents (particularly, those with side chains) which are hard to treat according to an activated sludge process, in order to solve the problem of said water pollution in view of the above-mentioned points.

In addition, another object of the present invention is to provide a process for purifying water, which process is capable of obtaining purified water conveniently by decomposing organic substances contained in water to be treated to carbon dioxide gas and water.

Further, another object of the present invention is to provide an economical and highly innoxious process for purifying water, which process can utilize waste fluid containing iron ions, since it is capable of using cheap and non-toxic titanium oxide and iron salt, and iron salt is used in a quite small amount.

Moreover, another object of the present invention is to provide a process for purifying water capable of obtaining water with high safety, in which chlorine need not be added, and hence, treated water is not contaminated with trihalomethane and organochlorine compounds having strong carcinogenicity formed by a reaction between organic substances contained in original water and chlorine.

And, another object of the present invention is to provide a process for purifying water, which process can obtain much larger effects of purifying water by carrying out water treatment according to an activated sludge process, after decomposing biologically resistant substances according to the process of water treatment of the present invention.

According to the present invention, the said objects can be accomplished by adding titanium oxide and a very small amount of iron salt into water to be treated such as waste water, and irradiating light thereupon.

The present inventors have engaged in assiduous studies with a view to developing an economical and convenient process for treating the above biologically resistant pollutants, and as a result, the present inventors have found an astonishing fact that biologically resistant pollutants can be decomposed readily and promptly according to a process which comprises adding titanium oxide and a very small amount of iron salt into water to be treated such as waste water, and irradiating light such as ultraviolet light thereupon. When the amount of iron salt to be added is large, however, said decomposition cannot be performed well. The present invention has been accomplished on the basis of this finding.

DETAILED DESCRIPTION OF THE INVENTION

Titanium oxide to be used in the present invention may be in the form of a powder, a pellet, or platelike or linear, and when it is a pellet, a platelike or linear one, it is preferable to be porous.

In addition, substrates such as glass, metals, ceramics and plastics coated with a titanium oxide film and vessels whose inner sides are coated with a titanium oxide film may be used. Materials of these vessels may be any of concrete, glass, plastics, ceramics, metals, etc., so far as they have a necessary strength. Besides, the vessels may be transparent or opaque, and when a titanium oxide film coating the inner side of a vessel is colorless and transparent, it is advantageous that the vessel is also transparent since light can pass through the wall from the outer side to be emitted onto the titanium oxide film. Titanium oxide is a material used for cosmetics and tooth powder, and since it is non-toxic, excellent in durability and can be used repeatedly, it is very economical.

As iron salt to be used in the present invention, not only ferrous salt but also ferric salt, a mixture of ferrous salt and ferric salt are preferable, and also, various salts such as sulfate, nitrate, carbonate, phosphate, acetate, oxalate, fumarate, lactate, citrate, ammonium salt, halides such as chlorides and bromide can be used, and particularly, nitrate and sulfate are preferable. Iron salt to be used in the present invention may be anhydrous salt, hydrous salt or waste fluid containing an iron ion. Iron salt such as iron sulfate has merits that it is cheap, harmless to circumstances and easy to handle.

As sources of light to be used in the present invention can be mentioned the sun, a glow lamp, a fluorescent lamp, a halogen lamp, a xenon lamp, a mercury lamp and a UV lamp. As light to be irradiated may be employed light containing much light with a short wavelength such as ultraviolet light, and further, light with a long wavelength such as visible light can be also used efficiently.

Vessels to be used in the present invention whose inner sides are coated with a titanium oxide film may be in the shape of a square pillar, a column, a globe, a circular cone, a gourd or a rugby ball.

Besides, they may be in the form of being closed, with or without a lid, or they may be in the shape of a round tube or a square tube such as reaction solution may pass through. Substrates to be used in the present invention whose surfaces are coated with a titanium oxide film may be in any shape.

A substrate and a vessel to be used in the present invention coated with a titanium oxide film may be produced according to a process which comprises forming a gel from alkoxide of titanium obtained by the reaction between titanium tetrachloride and alcohol according to a sol-gel method, and applying it onto the inner side of the vessel and the surface of the substrate according to dip coating, spin coating or coating, and then calcining them. Otherwise, they may be produced by heat-oxidizing the surface of a metallic titanium substrate and the inner side of a metallic titanium vessel with gas flames to form titanium oxide.

Or, they may be produced by calcination after the coating of the inner side of a vessel and the surface of a substrate according to a PVD method, a CVD method or a spattering method, and also, they may be produced by applying a suspension of titanium oxide of ultrafine particles onto the inner side of a vessel and the surface of a substrate according to dip coating, spin coating or coating, and then calcining them. Preferable calcination temperatures are in the range of 500° to 800° C. or so. Moreover, vessels may be produced by building up substrates coated with titanium, which is produced according to the above method, or plates of titanium oxide.

Further, a substrate and a vessel to be used in the present invention, which is coated with a titanium oxide film with iron salt added to it, may be produced by dipping the substrate and the vessel coated with a titanium oxide film obtained according to the above method in an aqueous solution of iron salt, and then drying them.

Moreover, they may be produced by adding iron salt or an aqueous solution thereof to a gel produced from alkoxide of titanium according to a sol-gel method, and applying it onto the inner side of a vessel and the surface of a substrate according to dip coating, spin coating or coating, and then calcining them. Otherwise, they may be produced by adding iron salt or an aqueous solution thereof into a suspension of titanium oxide of ultrafine particles, and applying it onto the inner side of a vessel and the surface of a substrate according to dip coating, spin coating or coating, and then calcining them. The most preferable calcination temperatures are in the range of 500° to 800° C. or so.

The amount of iron salt to be added in the present invention is very small and, though depending upon the amount of organic substances contained in water to be treated, 0.000001 to 5 weight % based on water to be treated is sufficient. In case of using a Fenton reagent, the amount of ferrous salt to be added into hydrogen peroxide solution is equivalent to the amount of hydrogen peroxide solution in mols, but in the present invention, the amount of iron salt to be added is far smaller than that of the former. Since water to be treated such as waste water already contains iron ions in many cases, it is often unnecessary to add iron salt therein.

Thus, by adding a very small amount of iron salt and titanium oxide or a substrate coated with a titanium oxide film into water to be treated such as waste water, and irradiating light thereupon, organic substances contained in water to be treated are readily decomposed and completely oxidized to carbon dioxide gas and water.

In addition, by putting water to be treated into a vessel whose inner side is coated with a titanium oxide film, and adding iron salt therein, and then irradiating light thereupon, or by dipping a titanium oxide film with iron salt added to it into water to be treated, and irradiating light thereupon, or by putting water to be treated into a vessel whose inner side is coated with a titanium oxide with iron salt added to it, and irradiating light thereupon, organic materials contained in water to be treated are promptly decomposed and completely oxidized to carbon dioxide gas and water. In case of using of a Fenton reagent, hydrogen peroxide solution must be added together with ferrous salt, and pH conditions of water to be treated are strict, and also its reaction progresses in a slow rate. On the other hand, according to the present invention, it is showed that it is not necessary to add hydrogen peroxide solution, and that not only ferrous salt but also ferric salt, a mixture of ferrous salt and ferric salt can be used, and that reaction conditions are not restricted, and that time for treatment can be largely reduced according to a simple method of irradiating light in comparison with the treatment by a Fenton reagent. A treatment velocity can be raised up by performing heating at the time of irradiating light simultaneously and the most preferable temperature is 70° C. or so.

Besides, by performing stirring then, can be further raised up the treatment velocity.

In order to further increase reaction efficiency, a titanium oxide film doped with magnesium, niobium, titanium, iron or dyes may be used, or a titanium oxide film further coated with a platinum film may be used. When not a titanium oxide powder but a titanium oxide film is used, it has an advantage that it needs no operation such as filtration for recovering a titanium oxide powder.

EXAMPLES

Typical examples of the present invention will be shown below, but the present invention is by no means restricted to them.

Example 1

18 ml of an aqueous solution of tetrachloroethylene having a concentration of 100 ppm (0.01 weight %) were put into a hard-glass test tube, a hard-glass plate coated with a titanium oxide film was dipped in it, ferric nitrate of 80 ppm (0.008 weight %) was added therein, and light of a xenon lamp of 300 W was irradiated with stirring by means of a magnetic stirrer thereupon for 1 hour and 15 minutes. As a result of analyzing the amount of tetrachloroethylene contained in the obtained reaction solution by means of a gas chromatograph, it was revealed that the amount of tetrachloroethylene had been reduced by 99%. When either a hard-glass plate coated with a titanium oxide film or ferric nitrate was not added, the amount of tetrachloroethylene contained in the reaction solution was hardly reduced.

Example 2

18 ml of an aqueous solution of tetrachloroethylene having a concentration of 0.05 ppm (0.000005 weight %) were put into a quartz test tube, and a quartz-glass plate coated with a titanium oxide film was dipped in it, ferric sulfate of 0.01 ppm (0.000001 weight %) was added therein, and light of a high-pressure mercury lamp of 300 W was irradiated with stirring by means of a magnetic stirrer thereupon for 30 minutes. As a result of analyzing the amount of tetrachloroethylene contained in the obtained reaction solution by means of a gas chromatograph, it was revealed that the amount of tetrachloroethylene had been reduced by 99%. When either a hard-glass plate coated with a titanium oxide film or ferric sulfate was not added, the amount of tetrachloroethylene contained in the reaction solution was hardly reduced.

Example 3

18 ml of an aqueous solution of trichloroethylene having a concentration of 1000 ppm were put into a quartz test tube, and a plate coated with a titanium oxide film was dipped in it, ferrous nitrate of 800 ppm was added therein, and light of a UV lamp of 500 W was irradiated with stirring by means of a magnetic stirrer thereupon for 40 minutes. As a result of analyzing the amount of trichloroethylene contained in the obtained reaction solution by means of a gas chromatograph, it was revealed that the amount of trichloroethylene had been reduced by 95%. When either a hard-glass plate coated with a titanium oxide film or ferrous nitrate was not added, the amount of trichloroethylene contained in the reaction solution was hardly reduced.

Example 4

30 ml of an aqueous solution of chloroform having a concentration of 200 ppm were put into a quartz vessel coated with a titanium oxide film, ferrous sulfate of 200 ppm was added therein, and light of a UV lamp of 300 W was irradiated with stirring by means of a magnetic stirrer thereupon for 45 minutes. As a result of analyzing the amount of chloroform contained in the obtained reaction solution by means of a gas chromatograph, it was revealed that the amount of chloroform had been reduced by 99%.

Example 5

25 ml of an aqueous solution of diethyl-p-nitrophenyl thiophosphate, an organic phosphorus agricultural chemical, having a concentration of 10 mmol/l were put into an aluminum vessel whose inner side was coated with a titanium oxide film, 2 weight % of ferric citrate were added therein, and light of a xenon lamp of 500 W was irradiated with stirring by means of a magnetic stirrer thereupon for 1 hour and 40 minutes. As a result of analyzing the value of TOC (total organic carbon) of the obtained reaction solution by means of a total-organic-carbon meter, it was revealed that the value of TOC of the reaction solution had been reduced by 90%.

Example 6

1 weight % of a titanium oxide fine powder and 5 weight % of ferric chloride hexahydrate were added into 20 ml of a 4 weight % solution of ethylenediamine tetraacetic acid disodium which is hard to treat according to an active sludge treatment, and light of a glow lamp of 500 W was irradiated with stirring thereupon for 2 hours. As a result of analyzing the value of TOC of the obtained reaction solution by means of a total-organic-carbon meter and the value of COD (chemical oxygen demand) by means of a COD measuring device, it was revealed that the value of TOC of the reaction solution had been reduced by 90% and that the value of COD had been reduced by 95%.

Example 7

50 ml of an aqueous solution of alkylbenzene sulfonic acid having a concentration of 70 ppm, a general concentration of a synthetic detergent (alkylbenzene sulfonic acid) contained in waste fluid discharged by laundries, were put into a quartz vessel, and a bundle of aluminum wire coated with a titanium oxide film was dipped in it, ferric phosphate of 70 ppm was added therein, and solar light was irradiated with stirring by means of a magnetic stirrer thereupon for 2 hours and 30 minutes. The value of TOC of the obtained reaction solution was analyzed by means of a total-organic-carbon meter and the concentration of alkylbenzene sulfonic acid was analyzed according to a methylene blue method. As a result, it was revealed that the concentration of alkylbenzene sulfonic acid of the reaction solution had been reduced to 5 ppm and that the value of TOC had been reduced by 92%.

Example 8

40 ml of an aqueous solution of diethylbenzene phosphonate, an organic phosphorus agricultural chemical, having a concentration of 5 mmol/l were put into a pyrex vessel whose inner side was coated with a titanium oxide film, 1 weight % of ferrous chloride tetrahydrate was added therein, and light of a xenon lamp of 500 W was irradiated with stirring by means of a magnetic stirrer thereupon for 50 minutes. As a result of analyzing the value of TOC of the obtained reaction solution by means of a total-organic-carbon meter, it was revealed that the value of TOC of the reaction solution had been reduced by 92%.

Example 9

20 ml of an aqueous solution of alkylbenzene sulfonic acid having a concentration of 200 ppm were put into a quartz vessel, quartz wool coated with a titanium oxide film was dipped in it, ferrous oxalate dihydrate of 200 ppm was added therein, and light of a UV lamp of 500 W was irradiated with stirring by means of a magnetic stirrer thereupon for 30 minutes. The value of TOC of the obtained reaction solution was analyzed by means of a total-organic-carbon meter and the concentration of alkylbenzene sulfonic acid was analyzed according to a methylene blue method. As a result, it was revealed that the concentration of alkylbenzene sulfonic acid of the reaction solution had been reduced to 10 ppm and that the value of TOC had been reduced by 95%.

Example 10

After a quartz-glass round tube whose inner side was coated with a titanium oxide film was dipped in a 10 weight % solution of ferrous sulfate ammonium and dried, 30 ml of an aqueous solution of 70° C. of 2,4-dimethylaniline, a material of dyes, having a concentration of 5 mmol/l were slowly poured therein, and light of a high-pressure mercury-lamp of 500 W was irradiated with circulating thereupon from the outer side for 45 minutes. As a result of analyzing the value of TOC of the obtained reaction solution by means of a total-organic-carbon meter, it was revealed that the value of TOC of the reaction solution had been reduced by 90%.

Example 11

40 ml of an aqueous solution of trichloroethylene of 300 ppm were put into an alumina vessel whose inner side was coated with a titanium oxide film with ferrous nitrate added to it, and light of a xenon lamp of 500 W from which light with shorter wavelengths than 380 nm had been removed by a cut filter was irradiated with stirring thereupon for 1 hour and 30 minutes. As a result of analyzing the amount of trichloroethylene contained in the obtained reaction solution by means of a gas chromatograph, it was revealed that the amount of trichloroethylene had been reduced by 93%.

Example 12

A hard-glass vessel whose inner side was coated with a titanium oxide film was put into an aqueous ethanol solution of 2 g/l potassium platinum acid chloride, and light of a low-pressure mercury lamp of 100 W was irradiated with stirring by means of a magnetic stirrer thereupon for 4 hours to coat the surface of a titanium oxide film with platinum. Into the vessel were put 30 ml of an aqueous solution of 4-nitrophenylethylphenyl phosphinate, an organic phosphorus agricultural chemical, having a concentration of 4000 ppm, ferrous chloride tetrahydrate of 2000 ppm was added therein, and light of a high-pressure mercury lamp of 500 W was irradiated with stirring by means of a magnetic stirrer thereupon for 1 hour. As a result of analyzing the value of TOC of the obtained reaction solution by means of a total-organic-carbon meter, it was revealed that the value of TOC of the reaction solution had been reduced by 98%.

Example 13

A quartz vessel whose inner side was coated with a titanium oxide film was put into an aqueous ethanol solution of 2 g/l potassium platinum acid chloride, and light of a low-pressure mercury lamp of 100 W was irradiated with stirring by means of a magnetic stirrer thereupon for 4 hours to coat the surface of a titanium oxide film with platinum. Into the vessel were put 15 ml of a 1 weight % solution of ethylenediamine tetraacetic acid disodium which is hard to treat according to an activated sludge process, and 2 weight % of ferrous sulfate heptahydrate were added therein, and then light of a xenon lamp of 500 W was irradiated with stirring by means of a magnetic stirrer thereupon for 1 hour and 20 minutes. As a result of analyzing the amount of total organic carbon (the value of TOC) contained in the obtained reaction solution by means of a total-organic-carbon meter, it was revealed that the value of TOC of the reaction solution had been reduced by 95%.

Example 14

After a hard-glass round tube whose inner side was coated with a titanium oxide film was dipped in a 10 weight % solution of ferric nitrate nonahydrate and dried, 30 ml of an aqueous solution of 50° C. of 2,4-dimethylaniline, a material of dyes, having a concentration of 5 mmol/l were slowly poured therein, and light of a xenon lamp of 500 W was irradiated with circulating thereupon from the outer side for 1 hour and 10 minutes. As a result of analyzing the value of TOC of the obtained reaction solution by means of a total-organic-carbon meter, it was revealed that the value of TOC of the reaction solution had been reduced by 90%.

Example 15

Into a hard-glass round tube whose inner side was coated with a titanium oxide film were poured slowly 15 ml of an aqueous chloroform solution having a concentration of 200 ppm with ferrous fumarate of 200 ppm added therein, and solar light was irradiated with circulating thereupon from the outer side for 2 hours. As a result of analyzing the amount of chloroform contained in the obtained reaction solution by means of a gas chromatograph, it was revealed that the amount of chloroform had been reduced by 85%.

Example 16

20 ml of an aqueous solution of O,O-dimethyl-S-( 1,2-dicarbethoxyethyl) phosphorodithioate, an organic phosphorus agricultural chemical, having a concentration of 4000 ppm, were put into a plastic vessel whose inner side was coated with a titanium oxide film, and ferrous lactate trihydrate of 2000 ppm was added therein, and then light of a xenon lamp of 500 W was irradiated with stirring by means of a magnetic stirrer thereupon for 1 hour and 20 minutes. As a result of analyzing the value of TOC of the obtained reaction solution by means of a total-organic-carbon meter, it was revealed that the value of TOC of the reaction solution had been reduced by 90%.

Example 17

50 ml of a 0.1 weight % aqueous ethanol solution were put into an alumina vessel whose inner side was coated with a titanium oxide film with ferrous nitrate added to it, and light of a UV lamp of 500 W was irradiated with stirring thereupon for 1 hour. As a result of analyzing the amount of ethanol in the obtained reaction solution by means of a gas chromatograph, it was revealed that the amount of ethanol had been reduced by 92%.

Example 18

40 ml of an aqueous methanol solution of 200 ppm were put into a hard-glass vessel whose inner side was coated with a titanium oxide film, and waste water containing iron ions of 200 ppm was added therein, and then light was irradiated by means of 10 fluorescent lamps of 30 W with stirring by means of a magnetic stirrer thereupon for 1 hour and 40 minutes. As a result of analyzing the amount of methanol in the obtained reaction solution by means of a gas chromatograph, it was revealed that the amount of methanol had been reduced by 98%.

As described above, the present invention provides an economical process for purifying water capable of treating polluted water, which contains agricultural chemicals, organic solvents (particularly, halocarbon) and/or surface active agents (particularly, those with side chains) which are hard to treat according to an activated sludge process, under moderate conditions readily and promptly, in order to solve a worldwide serious problem of water pollution.

According to the present invention, purified water can be obtained by a convenient method, which comprises adding titanium oxide and iron salt into water to be treated such as waste water, and irradiating light thereupon, and therewith, promptly decomposing organic substances contained in water to be treated to carbon dioxide gas and water.

Since titanium oxide and iron salt to be used in a process for purifying water according to the present invention are cheap and non-toxic, and iron salt is used in a very small amount, and also, waste fluid containing iron ions can be utilized, the process is very economical and can be performed with high safety.

Further, according to the process of the present invention, since it is not necessary to use chlorine, treated water is not contaminated with trihalomethane and organochlorine compounds having strong carcinogenicity, which are formed by a reaction between organic materials contained in original water and chlorine, and therefore, purified water can be obtained with high safety.

Much larger effects of purifying water can be obtained by performing water treatment according to an activated sludge process, after decomposing biologically resistant substances according to the process for treating water of the present invention.

What is claimed is:

1. A vessel for purifying water polluted with at least one pollutant selected from the group consisting of agricultural chemicals, organic solvents and surface active agents by irradiation with light in the presence of an iron salt, comprising:

a vessel whose inner sides are coated with a film of titanium oxide.

2. The vessel according to claim 1, wherein said film consists of titanium oxide.

3. The vessel according to claim 1, wherein said film of an oxide of titanium is doped with an element selected from the group consisting of magnesium, niobium, titanium, iron and dyes.

4. The vessel according to claim 3, wherein said element is magnesium.

5. The vessel according to claim 3, wherein said element is niobium.

6. The vessel according to claim 3, wherein said element is titanium.

7. The vessel according to claim 3, wherein said element is iron.

8. The vessel according to claim 3, wherein said element is a dye.

9. The vessel according to claim 1, wherein said film of titanium oxide is further coated with a platinum film.

10. The vessel according to claim 1, wherein said vessel is transparent.

* * * * *